Oct. 6, 1931.  R. D. BEAN  1,825,932
CONTROL METHOD AND APPARATUS
Filed March 6, 1928  2 Sheets-Sheet 1

INVENTOR.
Roscoe D. Bean
BY William A. Strauch
ATTORNEY.

Oct. 6, 1931.  R. D. BEAN  1,825,932
CONTROL METHOD AND APPARATUS
Filed March 6, 1928   2 Sheets-Sheet 2
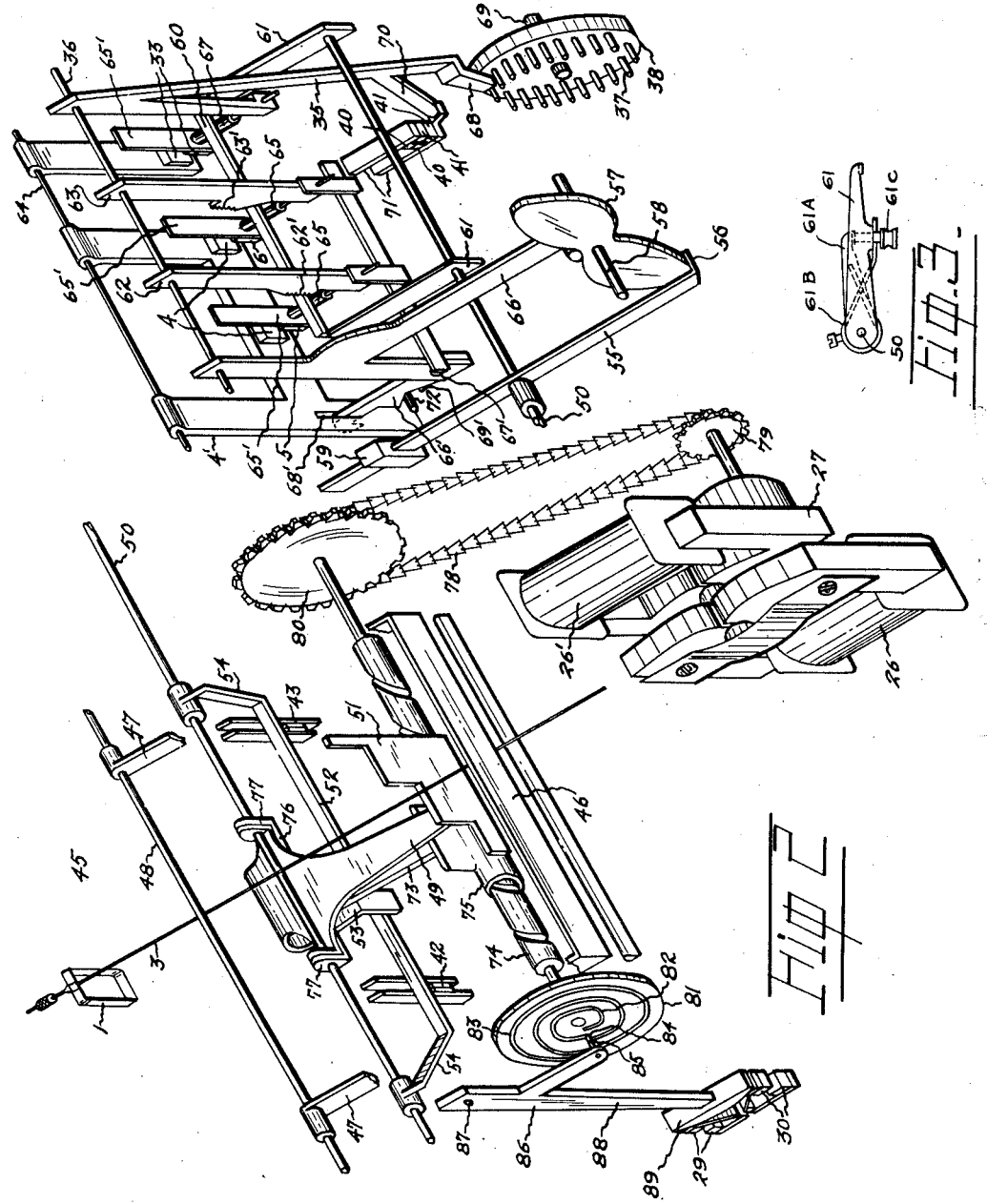
INVENTOR.
Roscoe D. Bean
BY
William A. Strauch
ATTORNEY.

Patented Oct. 6, 1931

1,825,932

UNITED STATES PATENT OFFICE

ROSCOE D. BEAN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

CONTROL METHOD AND APPARATUS

Application filed March 6, 1928. Serial No. 259,588.

My invention relates to control methods and apparatus, and more particularly to control methods and apparatus to maintain predetermined physical conditions at a controlled point or points such for example as the automatic regulation of temperature, gas pressure, chemical mixtures, fuel qualities, and the like.

In automatically controlling a furnace to a predetermined temperature, the control apparatus is connected to a temperature responsive device such as a thermocouple positioned at the point in the furnace at which the temperature is to be controlled, the control apparatus being arranged to vary the rate of heat supply in accordance with the temperature variations from a predetermined value. It is well known, however, that due to resistance to heat flow as well as other well known physical phenomena in the various parts of many types of furnaces there is a time lag in change of temperature so that when a change in the rate of fuel supply has been effected corresponding to the temperature deviation sufficient to restore desired temperature conditions, the furnace temperature will not immediately respond and the thermocouple will accordingly respond to a temperature other than that which the furnace will ultimately reach as a result of the new rate of fuel supply. The controller will therefore function to further vary the rate of heat supply in accordance with the off normal temperature to which the thermocouple still responds and the rate of fuel supply will thereupon be varied to not only restore the temperature to the desired value but an overcorrection of heat energy supply will be made and as a result the temperature will change beyond the desired value before the controller can act to vary the rate of heat energy supply sufficiently to stop further variation in the temperature. That is, a greater change in the rate of heat energy supply occurs responsive to a temperature variation from the predetermined temperature than is necessary to restore the temperature to its predetermined value and the temperature either rises above or falls below normal in response to each such variation of the temperature. This action is repeated carrying the furnace alternately to too high a temperature and to too low a temperature causing what is termed hunting. Similar hunting occurs in the control of chemical processes and like operations due to lag between the correction and change in the controlled condition.

It has been heretofore proposed to prevent hunting by providing prolonged intervals between the control operations to permit the controlled condition to respond at the controlled point to the correction. Where, however, it is desired to maintain constant conditions continuously and to quickly restore conditions to a predetermined value upon any variation therefrom, this method is entirely too slow and is particularly undesirable where continuous changes of governing conditions permit large departures from the desired values.

To overcome this difficulty follow up control arrangements have been provided which respond quickly to any change in the quantity being regulated and in proportion to the rate of change of that quantity. A simple illustration of such a control may be found in a metal rod or pyrometer of small thermal capacity and therefore quickly responsive to temperature variation. Placed in a furnace and mechanically connected to a fuel valve, such a rod expands and contracts as the temperature of the furnace rises and falls to move the fuel valve and the movement of the fuel valve in turn is proportional to the expansion and contraction of the rod. In response to a rapid rise in temperature, the rod expands rapidly and the fuel supply decreases rapidly. Conversely a sudden drop in temperature results in the rod contracting rapidly and opening the fuel valve rapidly. It is evident that by properly proportioning the valve opening, a true follow-up control which varies the fuel supply according to the rate of change in temperature can be produced.

A characteristic of this control is its stabilizing tendency. It quickly opposes any change in the quantity being regulated, regardless of whether the change be away from or towards normal. This simple type of follow-up control fails however to hold the temperature at the exact value desired because after having departed from normal and as a result moved the valve to a new position the temperature may not again return to normal as long as the valve is in its new position and therefore this control is inaccurate in the maintenance of the exact value desired.

A second type of control known as the on and off control responds to changes in temperature from a predetermined value but is independent of the rate of change. This control responds slowly to the value of the temperature and has no stabilizing influence inasmuch as while it maintains an average temperature it of necessity "hunts."

Both of the types of control described above have been employed independently but the result produced has been either inaccurate in value or there has resulted a continuous hunting action above and below the desired temperature.

In accordance with my invention, novel and more accurate methods of control and apparatus therefor are provided by utilization of control apparatus which responds rapidly to the rate of change of the quantity being regulated to act as a stabilizing element opposing the change and responds more slowly to the value of the temperature to readjust the stabilizing element.

Accordingly an object of my invention is to provide novel and simplified control methods and apparatus by use of which hunting is minimized.

A further object of my invention is to provide control methods and apparatus in which a variable predetermined relationship is established between the control apparatus and control mechanism for a condition varying agent, the control mechanism for the varying agent being restored to the given predetermined relationship until a prolonged change of the controlled conditions causes a change in the predetermined relationship of the control apparatus and the control mechanism for the condition varying agent.

Other objects of my invention will appear in the following detailed description of the preferred embodiment of my invention and are such as may be attained by utilization of the various principles, combinations and sub-combinations hereinafter set forth and defined by the terms of the appended claims.

Referring to the drawings:

Figure 2 is a perspective view with parts broken away of a preferred form of apparatus which may be employed in the control system shown in Figure 1.

Fig. 3 is a view in elevation of a detail.

Figure 1:
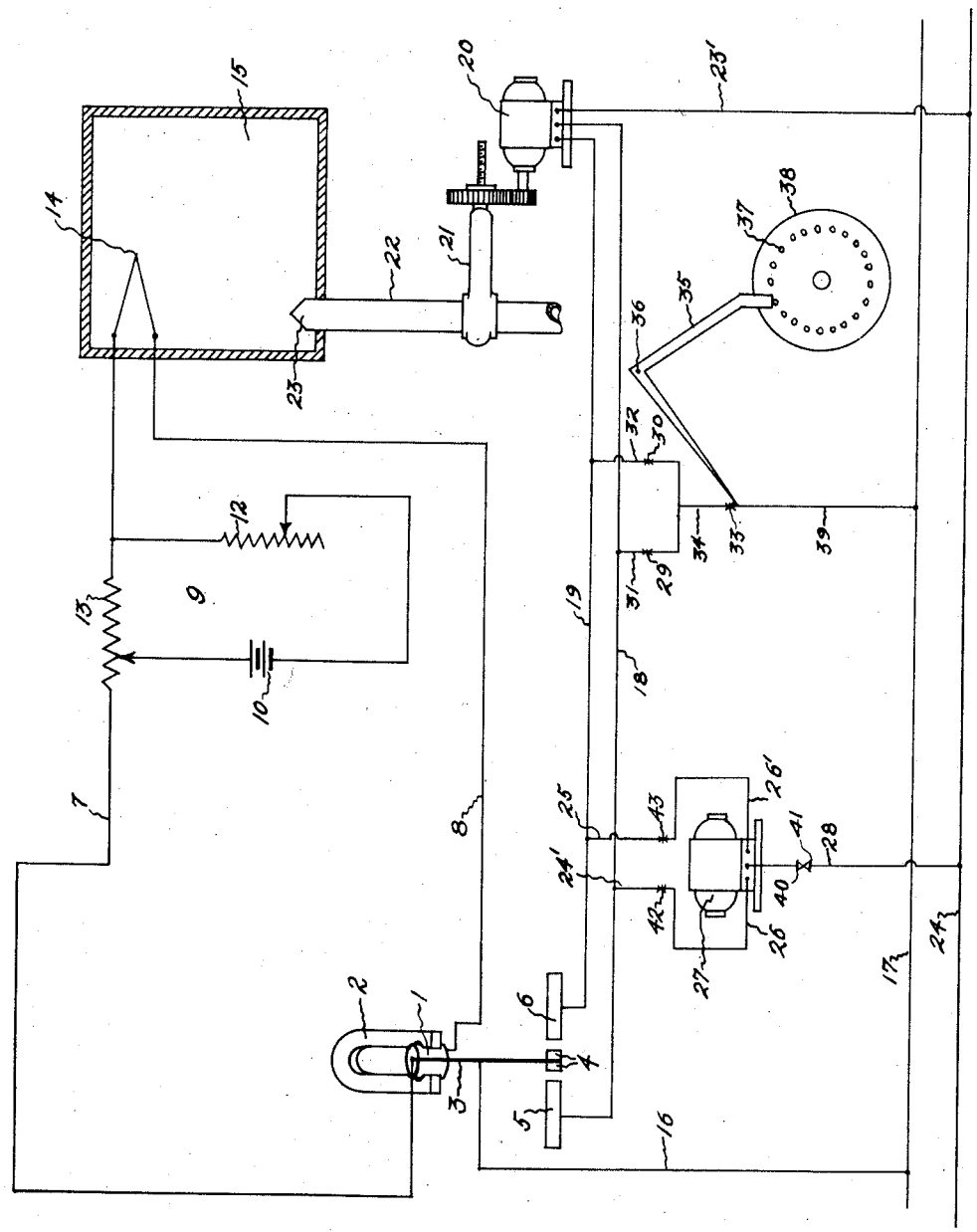
Figure 1 is a diagrammatic illustration of one form of apparatus and circuit arrangement employed in carrying out my invention.

As shown in Figure 1, a control galvanometer is provided comprising a movable coil 1 suspended between the poles of a permanent magnet 2. Secured to the coil 1 is a pointer 3 provided with a contacting portion 4 adapted to co-act with contacts 5 and 6. It will be understood that this is a diagrammatic illustration of the contact operation, the actual contacting being preferably accomplished by a periodically operating control mechanism shown in Figure 2 and described in detail hereinafter. The galvanometer coil 1 is connected in a circuit comprising conductors 7 and 8, a potentiometer 9 embodying a battery 10, and adjustable resistances 12 and 13, and a thermocouple 14. The thermocouple 14 is located in a furnace 15, the temperature of which is to be maintained constant and which for example, may be the furnace of a tubular oil still requiring accurate temperature regulation.

The galvanometer circuit including the potentiometer 9 is so adjusted that when a predetermined desired temperature is obtained in the furnace, the voltage generated by the thermocouple 14 balances that of the potentiometer circuit 9 and the galvanometer pointer 3 remains at its neutral position intermediate the contacts 5 and 6. When a drop in temperature below the predetermined value occurs, the voltage generated by the thermocouple 14 is less than that in the potentiometer circuit and a resultant current flows through the coil 1 to deflect the pointer 3 clockwise, the extent of deflection being proportional to the variation of the temperature from the predetermined value and contact 4 of the pointer 3 engages contact 5. Similarly, when a rise in temperature above the predetermined value occurs in the furnace 15, the current generated by the thermocouple 14 exceeds that in the potentiometer circuit 9 producing an unbalance and current flows through the coil 1 in a direction to deflect the pointer 3 counter-clockwise, causing engagement of contacts 4 and 6.

The pointer 3 establishes a connection by means of conductor 16 to one side 17 of a power line which supplies the necessary electrical energy for operations hereinafter described. Contacts 5 and 6 are connected by means of conductors 18 and 19 respectively to terminals of a reversible motor 20 which operates a fuel supply valve 21 in fuel supply line 22 connected to burner 23 of the furnace 15. It will be apparent that motor 20 may operate any form of heat controlling means as for example a rheostat or equivalent mechanism of an electrical furnace. Motor 20 is connected by common return conductor 23' to the lead 24 of the power line. When the galvanometer pointer 3 operates to cause contacts 4 and 5 to engage in response to a drop in temperature as described above, a circuit is completed for the motor 20 from the side 17 of the power line, over conductor 16 through the contact 4 and contact 5 in engagement therewith, conductor 18, and through the winding of the motor 20 to conductor 23' connected to conductor 24 of the power line. As a result of this circuit the motor 20 rotates in a predetermined direction for increasing the opening of the valve 21 to increase the rate of heat energy or fuel supply. When the pointer 3 operates to cause contacts 4 and 6 to engage in response to a rise in furnace temperature above the predetermined value, a circuit is completed for motor 20 from line 17 over conductor 16, pointer 3, contacts 4 and 6 in engagement with each other, conductor 19, winding of motor 20 and over conductor 23' to line 24. Motor 20 will thereupon rotate in the opposite direction to partially close the valve 21 and decrease the rate of heat energy or fuel supply to the furnace 15.

Connected in multiple with the conductors 18 and 19, leading to motor 20, are conductors 24' and 25 respectively connected to terminals 26 and 26' of the windings (not shown) of a reversible motor 27. The midterminal of the windings of motor 27 is connected by conductor 28 to the side 24 of the power line. When pointer 3 causes contacts 4 and 5 to engage and a circuit is completed for motor 20 as described above, a multiple circuit is completed over conductor 24', a winding of the motor 27 and conductor 28 to line 24. Motor 27 thereupon rotates to vary the contacting position of the pointer 3 and contacts 5 and 6 through any suitable mechanism, such for example as more fully hereinafter set forth, in such manner that pointer 3 is prevented from causing immediate re-engagement of contacts 4 and 5 notwithstanding that pointer 3 is still in deflected position. A similar circuit is completed through the other winding of motor 27 when pointer 3 causes engagement of contacts 4 and 6, causing motor 27 to rotate in the reverse direction and operating through said mechanism to prevent immediate re-engagement of contacts 4 and 6.

In each of the above mentioned operations caused by reversible motor 27, re-engagement of contact 4 with contacts 5 and 6 respectively is preferably prevented by shifting the relationship of the contacts and pointer 3 so that pointer 3 will again be intermediate contacts 5 and 6 and will therefore fail to reclose the contacts 4 and 5 or 4 and 6 as the case may be, even though pointer 3 is still in a deflected position. A suitable contacting galvanometer mechanism with a follow-up control to perform this function is described hereinafter in connection with Figure 2.

Two sets of contacting members 29 and 30 are connected by conductors 31 and 32 respectively to conductors 18 and 19 leading to motor 20. The opposite terminals of contacting members 29 and 30 are joined and connected to a contacting member 33 by means of conductor 34. One of the contacts of contacting member 33 is fixed and the other is actuated by a lever mechanism 35 controlled by pins 37 of disk 38 suitably mounted for rotation. As disk 38 rotates, lever 35 is engaged by successive pins 37 and is rocked on its pivot 36 to alternately close and open contacts 33. The interval of closing and opening contacts 33 is variably adjusted as desired by controlling the rate of rotation of disk 38. The lever controlled contact 33 is connected by means of conductor 39 to line 17, providing an energizing circuit for motor 20 independently of contacts 4, 5 and 6.

Contacting mechanisms 29 and 30 are controlled by any suitable mechanism, preferably in the manner hereinafter set forth in connection with Figure 2 so that contacts 29 will close following the engagement of contacts 4 and 5 and the corresponding operation of motors 20 and 27 above set forth and so that contacts 30 will close following the operation of motors 20 and 27 as a result of the engagement of contacts 4 and 6.

It will be noted that contacts 29 and 30 control circuits to the motor 20 which are independent of the galvanometer pointer circuits and accordingly the motor 20 is operated independently of the position of the galvanometer pointer 3 with respect to the contacts 5 and 6. When contacts 29 are closed and contacts 33 close, a circuit is completed for motor 20 from line 17 over conductor 39, contacts 33, contacts 29, conductor 31, conductor 18, and conductor 23' to the line 24, and motor 20 is operated in the same direction as when contacts 4 and 5 engage and open the fuel valve 21. Similarly, a circuit is completed over conductors 32 and 19 when contacts 30 are closed and contacts 33 close, the current flowing through motor 20 in the same direction as in the case when contacts 4 and 6 engage and the motor 20 thereupon operates to decrease the fuel valve opening or heat energy supply.

Connected in the circuit of conductors 24' and 25 are contact or switch members 40 and 41 respectively, also controlled by disk 38 through any suitable mechanism such for example as is described in detail in connection with Figure 2, to simultaneously open with the closing of contacts 33 and to close with the opening of contacts 33. When, therefore, a circuit for motor 20 is completed through either contacts 29 or 30 as described above, no circuit is completed for the motor 27. The purpose for this will be explained more fully in the description of operation following. In series with contacts 40 and 41 are normally closed limit contacts 42 and 43 opened respectively when the mechanism operated by motor 27 has reached the limits of its movement. The purpose of contacts 42 and 43 is to prevent further operation of motor 27 through suitable devices such for example as hereinafter set forth in connection with Figure 2.

During operation of the mechanism so far described, in response to a drop in temperature below the predetermined value, contacts 4 and 5 are periodically closed to operate motor 20 which increases the opening of the fuel supply valve 21 to oppose the temperature change. Simultaneously, motor 27 operates to shift the position of contacts 5 and 6 with respect to contacts 4 in the direction of the pointer deflection to decrease the extent of correction in the succeeding periods of operation or to prevent operation of the contacts depending upon the adjustment of the apparatus.

If the furnace temperature changes at a slow rate the first change in the fuel valve 21 in response to the engagement of contacts 4 and 5, will cause the temperature to restore towards normal with the result that the pointer 3 will tend to restore towards its neutral position and as the contacts 5 and 6 have in effect followed the original deflection of the pointer 3, the contact 6 will be engaged by contact 4 as the galvanometer pointer 3 moves towards its neutral. Engagement of contacts 4 and 6 will complete a circuit for reversing the operation of the motor 20 to decrease the opening of fuel valve 21, and for motor 27 to again adjust the contacts in the direction of the galvanometer pointer movement. From the above assumed operation, it is evident that the follow up control of the table responds rapidly to the rate of change of temperature to oppose such change.

If, however, the change in temperature is prolonged and restoration of the control mechanism to neutral does not occur promptly, after an interval of time one of the pins 37 on rotating disk 38 will cause engagement of contacts 33. It will be recalled that one result of the operation of motor 27 was to close contacts 29. Accordingly a multiple circuit is now completed for the motor 20 through contacts 29 and 33 as traced above, whereupon the motor 20 operates to further increase the opening of the fuel valve 21 independently of the control of pointer 3 and contacts 4 and 5. The contacts 33 will then disengage under control of wheel 38. During this operation of the fuel supply valve 21, terminals 26 and 26' of motor 27 are momentarily disconnected by disengagement of contacts 40 and 41 under control of wheel 38. This is done to prevent operation of the motor 27 during the intervals when the fuel feed control motor 20 is under the control of wheel 38. We have therefore on and off control now of motor 20 which is independent of the relative position of the galvanometer needle 3 and the table. By this on and off control, the fuel supply is varied solely in accordance with the temperature of the furnace and acts to restore the temperature to normal. If, due to this further opening of the fuel supply valve 21, the temperature restores to its predetermined value, the control mechanism will restore to neutral position as above set forth, the parts being so proportioned that contacts 33 will not again re-engage before contacts 29 are opened due to the restoration of the mechanism to neutral position. If, on the other hand, the temperature still fails to restore, the contact 29 will remain closed, the mechanism will remain in off normal position, and after an interval of time, contacts 33 will again close the circuit for the motor 20 producing a still further opening in the fuel supply valve. This operation will be repeated until the temperature begins to restore to normal between a period of closing of contacts 33.

Operation similar to that described in connection with the drop in temperature below the predetermined value will be repeated when a rise in temperature above the predetermined value occurs, except that in such case contacts 4 and 6 will close to operate the motor 20 in the opposite direction for decreasing the opening of valve 21 to reduce the rate of fuel or heat supply and will simultaneously energize motor 27 to shift the relative contacting position of contacts 4 and 6 in the direction of the deflection of the galvanometer, which in turn, will result in the closing of the contacts 30. It will be evident from the above description that two controls each acting in its own particular manner are interrelated in such a way as to produce a rapid control with substantially no hunting. The follow up control responds rapidly to the rate of temperature change to oppose or counteract such change. It acts as a stabilizer of the furnace temperature to prevent it from changing from the particular temperature it has at that time obtained. It is evident however, that this in itself would not suffice inasmuch as a change from the predetermined value will have occurred before the follow up succeeds in stopping further change and thereafter some arrangement is necessary to bring the temperature back to its original value.

This is accomplished by the on and off control which functions independently of the pointer 3, but in response to the actual temperature variation from the predetermined value to restore the temperature.

Having described the principle and general apparatus for carrying out my invention, the details of a preferred form of control mechanism for carrying out these operations as well as others will now be set forth. As shown in Figure 2, this mechanism comprises a controller 45 embodying a galvanometer coil 1 and pointer 3 in operative relation therewith as described in connection with Figure 1. Pointer 3 is periodically depressed by rail 46 mounted in such a manner that it normally tends to move downward under the action of gravity in which movement it depresses the galvanometer pointer 3. Rail 46 is supported on the outer ends of arms 47, the inner ends of which are rigidly secured to the shaft 48 which is oscillated by any suitable mechanism (not shown).

Associated with the pointer 3 is a control table 49 which is slidably and pivotally supported on a rock shaft 50 suitably journaled in the instrument frame work (not shown). The control table 49 is freely rotatable on the rock shaft 50 and may be adjusted longitudinally of the latter in response to deflections of the pointer 3 as hereinafter explained. At its front end the control table 49 is provided with an upturned contacting portion 51 for engaging the pointer 3. The upper edge of portion 51 is formed in steps which may be regularly arranged as shown, or any suitable stepped or sloping arrangement thereof may be employed to permit the desired variable movement of table 49 before engaging the pointer in accordance with the extent of deflection thereof.

The control table 49 is periodically oscillated to lift the portion 51 and to contact the upper edges thereof with the pointer 3 by an actuator in the form of a bar 52 co-acting with a tail portion or extension 53 of the table 49. Bar 52 extends parallel to the shaft 50 and is supported on the outer end of arms 54, rigidly secured to and rotatable with rock shaft 50. Secured to the shaft 50 is a lever 55 provided with an end projection 56 in engagement with the surface of cam 57 turning shaft 50 in a counter-clockwise direction under control of cam 57. It will accordingly be seen that table 49 is connected to rock shaft 50 for counter-clockwise movement under control of cam 57 by means of extension 53 and bar 52 and the counter-clockwise turning movement of the rock shaft 50 and table 49 under influence of cam 57 and weight 59 is arrested by the engagement of contacting portion 51 with the galvanometer pointer 3. The angular position of the rock shaft 50 when its motion is thus interrupted determines which of the control contacts 5 and 6 is to be engaged by the control contact 4, and also determines the duration of such engagement.

In the form of mechanism illustrated, the means whereby the position of the rock shaft 50 determines the control contact engagement includes a selector member comprising a bar 60 carried by arms 61 mounted on and yieldably coupled to shaft 50.

The detail of construction shown in Fig. 3 illustrates one form of yieldable coupling between the shaft 50 and the frame 61. The frame 61 is mounted for rotation on the shaft 50 and the arm 61$^A$ is rigidly secured to the shaft 50. A spring 61$^B$ connected at its ends to the arm 61$^A$ and to the frame 61 tends to urge the arm 61$^A$ and the frame 61 together. A screw 61$^C$ carried in the frame 61 is provided for adjusting the relation between the shaft 50 and the frame 61. So long as the frame 61 is free to move it follows the arm 61$^A$ due to the action of spring 61$^B$. When the bar 60 is engaged by either of the levers 62 or 63, frame 61 is held stationary and the shaft 50 together with arm 61$^A$ rotates with respect thereto due to the yieldable coupling. This connection rotates the selector member with shaft 50 but yields to permit said selector member to be held stationary when it is operatively engaged by the separated sloping control sections 62' and 63' of either of the contact actuating levers 62 and 63.

The contact actuating levers 62 and 63 are mounted on and depend from stationary shaft 36 and carry at their lower ends adjustable contact engaging parts 65 which force the contacts 5 and 6 respectively into engagement with contacts 4, mounted on the contact carrier frame 4' which is pivotally mounted on shaft 64. Each of the contact engaging parts 65 cooperates with a spring supporting member 65' shaped to normally hold the contacts 5 and 6 disengaged from the co-operating contacts 4 which are periodically shifted to engage the selected contact 5 or 6 at a point in its cycle of operation determined by the position of bar 60. Contacts 4 are periodically moved toward the contacts 5 and 6 by means of a lever 66 fulcrumed on the shaft 36 and engaging the upper side of the cam 57 carried by the shaft 58. A latch 66' is pivotally connected at one end 67' to the lower portion of the lever 66, the other end of said latch being slidably connected to the contact carrier frame 4' at 68'. The lower edge of the latch 66' has formed thereon the cam surface 69' which rides on the rod 72. As the lever 66 is turned counter-clockwise by the cam 57, the latch 66' causes the contact carrier frame 4' to swing about the shaft 64, moving contact 4 toward contacts 5 and 6 to be engaged by one or the other of these contacts as described above. The parts are so relatively arranged and timed that the levers 62 and 63 are held out of position to engage the selector bar 60 during the periods in which the rock shaft is rotating.

The bar portion 60 of the selector serves as a stop against which the serrated sloping control sections of one or both of the levers 62 and 63 may bear so that one or the other of the levers is prevented from moving into engagement with the corresponding contact 4 and the position of engagement of the contacts is predetermined while at the same time the other lever may or may not be held at a predetermined distance away therefrom. The particular lever 62 or 63 thus held in predetermined operative position controls the point of engagement of the selected contact 5 or 6 with the contact 4 in the cycle of movement of contact 4 while the disengagement of the contacts occurs invariably at the end of a cycle of periodic operation of the mechanism. When the pointer 3 is deflected to the low side of the neutral point, the control table and shaft 50 are rocked, until a step 51 engages the pointer. This determines the angle of rotation of shaft 50. The angular rotation of shaft 50 in turn rocks arms 61 and the cross bar 60 until it is directly opposite and in the path of the serrated portions of levers 62 and 63. In the present case, the angular movement of cross bar 60 is such that it is in the path of lever 63 which is thereby prevented from moving its contact to engage contact 4. Similarly if the pointer 3 is deflected to the high side of the neutral point of the control table 49, the bar 60 is rocked through an angle such that it is in the path of lever 62. The lever 63 is then moved so as to permit the contacts 4 and 6 to engage.

The third pair of contacts 33 is controlled by a lever 35 pivotally mounted on and depending from the stationary shaft 36 and carrying at its lower end a contact operating member 67 for controlling contacts 33. Lever 35 is provided with a cam member 68 arranged to engage pins 37 projecting from disk 38. The disk 38 is secured to and rotatable with shaft 69. Lever 35 is rocked by gravity to move the contacts 33 into engagement. As the disk 38 rotates clockwise, cam 68 is engaged by a pin 37 and is moved outward so that lever 35 is rocked on its pivot 36 to move the contacts 33 out of engagement with each other. As disk 38 continues to rotate, the pin 37 in engagement with cam 68 will pass thereunder, permitting cam member 68 and the end of lever 35 to drop under the force of gravity re-engaging contacts 33. The timing of the operation of contacts 33 may be varied by varying the spacing of pins 37 and the speed of rotation of disk 38. In one commercial form of tubular oil still control, three minute intervals between contacting was found satisfactory although this will depend on many factors met in practice. Secured to lever 35 is an extending arm 70 which actuates fixed contact springs 71 upon which contacts 40 and 41 are carried to cause the contacts 40 and 41 to engage when contacts 33 are separated and to separate when contacts 33 are engaged.

In operation, the position of the control table 49 longitudinally of the rock shaft 50 depends upon the deflecting pointer 3, and the means by which the table adjustment longitudinally of the shaft 50 is effected, comprises a carriage 73 mounted on shaft 74, and provided with a projection 75 entering a helical groove formed in shaft 74. Carriage 73 is provided with an extension 76 carrying apertured ears 77 located at opposite sides of the table 49 and through which the shaft 50 extends. In consequence as the shaft 74 is rotated, table 73 is shifted longitudinally of shaft 50. Motor 27 comprising coils 26 and 26' is suitably supported on the frame work (not shown) and when energized, rotates the shaft 74 through chain 78 and sprockets 79 and 80 in a direction depending on which of the coils 26 and 26' of the motor is energized as described hereinbefore in connection with Figure 1.

Secured to the end of shaft 74 opposite sprocket 80 and driven thereby is a disk 81 provided with spiral grooves 82 and 83 which merge into each other at 84. A switch arm 86 depending from a pivot at 87 is provided with an actuated pin 85 riding in grooves 82 and 83. Secured to extension 88 of the lever 86 is a contact carrying member 89, carrying the contacts 29 and 30. With the mechanism neutral, the lever 86 is so positioned that neither of the contacts 29 or 30 are in engagement. Rotation of the shaft 74 as described above in one direction from neutral will, however, cause closing of contacts 29 whereas rotation of the shaft in the opposite direction from neutral will cause closing of contacts 30.

Suitably supported from the frame work of the mechanism (not shown) are sets of contacts 42 and 43 in the path of movement of extension 53 of the table 49. As the table 49 reaches its limit of movement to the left, contacts 42 will be opened by engagement with extension 53. Similarly upon movement of the table to its right limit contacts 43 will be disengaged.

The operation of the mechanism disclosed in Figure 2 for carrying out operations described in connection with Figure 1 will now be evident from a brief summary. In operation, shafts 48, 58 and 69 are driven from a common motor (not shown) and bails 46 and 52 are periodically raised and lowered to periodically depress the galvanometer pointer 3 and to raise table 51. With the pointer 3 undeflected, table 49 will be in the neutral position shown, lever arm 86 will be positioned to maintain contacts 29 and 30 disengaged and as table 49 is raised and lowered the movement of bar 60 is such that neither contact 5 nor 6 is positioned to be engaged by contact 4. If now pointer 3 deflects from its neutral position sufficiently, upon the next upward periodic operation of the table 49, pointer 3 will be positioned to be engaged by a different step of contacting member 51, and the table together with shaft 50 and bar 60 will be arrested in position to cause engagement of contact 4 with contact 5 or 6 depending upon the direction of deflection of pointer 3, to complete a circuit for the fuel valve motor 20, and winding 26 or 26' of motor 27. The motor 20 rotates to properly increase or decrease the opening of the fuel valve 21 as above set forth and motor 27 operates to move the table 49 transversely with respect to the shaft 50 in the direction of the pointer deflection. Rotation of shaft 74 rocks the lever 86 about its pivot 87 to close contacts 29 or 30. In the particular form of invention shown, the adjustment is such that upon the next periodic operation of the table 49, if pointer 3 does not restore towards normal, neither contacts 5 nor 6 are closed inasmuch as the neutral position of the table 49 is shifted directly under the galvanometer pointer 3 and no engagement of contacts 4 with 5 or 6 can occur.

It is manifest from the above description that when the galvanometer pointer 3 deflects in response to a temperature change, the rate of fuel supply is varied through operation of the fuel valve 21 to prevent further change in the temperature and simultaneously the table 49 is moved with respect to the pointer 3, so that pointer 3 occupies a new neutral position with respect to the table 49. Since, however, the table 49 is in an off normal position, contacts 29 or 30 close depending upon the position of the table and further variations in the rate of fuel supply are brought about by the further operation of the motor 20 under control of contacts 29 or 30. As the temperature is restored the pointer 3 returns toward its original neutral position and completes a circuit for the motor 20 for rotating it in the opposite direction and a circuit for the motor 27 which will thereupon return the table back towards its normal position.

Although I have disclosed a preferred form of my invention and a specific application of my control mechanism, it will be apparent that many modifications thereof may be made by those skilled in the art without departing from the spirit of my invention, as defined by the terms of the appended claims.

Accordingly, what is desired to be secured by Letters Patent and is claimed as new is:—

1. The method of temperature control which comprises operating a first control in accordance with the rate of temperature changes for opposing temperature changes and operating a second control in accordance with temperature variations from a predetermined value for restoring the temperature to said value.

2. The method of temperature control which comprises varying a fuel supply in accordance with the rate of temperature change and independently varying the fuel supply in accordance with the variations of the temperature from a predetermined value.

3. In a temperature control system, a furnace, means for controlling the rate of fuel supply to said furnace, a control table movable in accordance with variations in temperature of said furnace for varying the fuel supply a sufficient amount to counteract such variations and means controlled by said control table for further varying said fuel supply to restore said temperature to a predetermined value.

4. In a control system, a motor, a control device including a galvanometer pointer and a periodically operating table, means for deflecting said pointer, means responsive to the engagement of said periodically operating table and said pointer for operating said motor and means controlled solely by said table for operating said motor.

5. In combination, control apparatus, controlled device, said control apparatus normally having a fixed relation with respect to said controlled device; means controlled by said control apparatus under predetermined conditions for operating said controlled device while maintaining said relation fixed; and means responsive to other conditions for varying the relation of said controlled device with respect to said control apparatus.

6. The method of control which comprises maintaining a fundamental fixed relationship between control apparatus and the controlled means while varying the control apparatus in accordance with momentary deviations in the controlled condition from a predetermined value; and varying the fundamental relationship between the control apparatus and the controlled means in response to prolonged deviations in the controlled condition from said predetermined value.

7. In a control system, a furnace to be controlled to a predetermined temperature, a fuel supply means for varying the rate of fuel supply to said furnace having a predetermined opening, a control apparaus comprising a galvanometer, means controlled by said galvanometer for operating said fuel supply means in accordance with variations in temperature of said furnace from said predetermined temperature, a movable table means operated from a normal position by said galvanometer controlled means in accordance with variations in temperature of said furnace for rendering said galvanometer non-operative, said galvanometer controlled means being operative to restore said fuel supply means to its predetermined opening while said control table is restored to its normal position.

8. In a control system, a furnace condition controlling means, a control apparatus therefor and means controlled by said control apparatus for operating said condition controlling means in accordance with the extent of variation of the condition from a predetermined value, means for simultaneously rendering said control apparatus non-operative, said means further operating said condition controlling means independently of said control apparatus.

9. In a control device, a fuel supply valve, a control apparatus comprising a deflecting galvanometer pointer, a movable table, means controlled by said pointer for operating said fuel valve in accordance with the extent of deflection thereof, means for simultaneously moving said control table to render said galvanometer pointer non-operative and means controlled by said table for further operating said fuel control valve independently of said galvanometer.

10. In a control apparatus, a galvanometer pointer and a movable table cooperating with said pointer, means controlled in accordance with the deflection of said pointer and means for simultaneously moving said control table in accordance with the deflection of said pointer, said first mentioned means being also controlled in accordance with the movement of said control table.

11. In a control system, heat controlling means, a galvanometer provided with a deflecting member, a control table, means controlled jointly by said deflecting member and table for controlling said heat controlling means and means whereby said control table controls said heat controlling means independently of said deflecting member.

12. In a control system, a fuel supply means, a galvanometer provided with a deflecting member, a control table cooperating with said deflecting member, means for moving said control table in accordance with the deflection of said deflecting member and means for controlling said fuel supply in accordance with the position of said control table.

13. In a control system, a fuel supply means, a galvanometer including a deflecting member, a control table cooperating with said deflecting member, means for moving said control table in accordance with the deflection of said deflecting member and means whereby said control table operates said fuel supply means solely.

14. In a control apparatus, a furnace, a galvanometer including a deflecting member, a control table, means responsive to deviations in temperature of said furnace from a predetermined temperature for operating said galvanometer, means responsive to deflections of said galvanometer for varying the fuel supply to said furnace and for simultaneously moving said control table, means responsive to the movement of said control table for rendering said galvanometer non-operative to further vary said fuel supply, in accordance with the deviations in temperature, said galvanometer being responsive to changes in temperature of said furnace toward its predetermined value for restoring said fuel supply to its original rate and simultaneously rendering itself operative again.

15. In a control apparatus, a furnace, a galvanometer including a deflecting member, a control table, means responsive to the deviations in temperature of said furnace from a predetermined temperature for operating said galvanometer, means responsive to deflections of said galvanometer for varying the fuel supply to said furnace and for simultaneously moving said control table, means responsive to the movement of said control table for rendering said galvanometer responsive to further changes in the temperature of said furnace toward its predetermined value for restoring said fuel supply to its original rate and for simultaneously rendering itself operative again and means operative in the event that said temperature fails to restore to its predetermined value for operating said fuel control means independently of said galvanometer.

16. In a control apparatus, a furnace, means for controlling the heat supply to said furnace, control apparatus comprising a galvanometer having a deflecting member responsive to the variations in temperature of said furnace from a predetermined temperature for controlling said first mentioned means, means simultaneously responsive to the deflection of said deflecting member for rendering said galvanometer non-operative to further operate said heat supply means and means operative after an interval of time for further varying said heat supply means independently of said deflecting member.

17. In a control apparatus, a fuel control means, a galvanometer including a deflecting member, means variably operated in accordance with the deflection of said deflecting member for operating said first mentioned means and means independent of said deflecting member for operating said first mentioned means.

18. In a control apparatus, a fuel control means, a galvanometer including a deflecting member, a table co-acting with said deflecting member, means responsive to the co-action of said table with said deflecting member for operating said table in accordance with the extent of deflection of said deflecting member and means being controlled by said table in operated position during the return of said table to normal.

19. In a temperature control system, a motor for controlling the rate of fuel supply, a control device responsive to variations of temperature from a predetermined value for operating said motor in accordance with temperature variations and a second control device operated in accordance with temperature variations for controlling said motor in accordance with said temperature variations.

20. In a temperature control system, a motor for controlling the rate of fuel supply, a control apparatus responsive to temperature variations comprising a galvanometer, a pointer therefor and a movable table, a motor for moving said table responsive to the extent of deflection of said galvanometer pointer, means including circuit connections for operating said fuel supply motor in accordance with the extent of deflection of said pointer and means responsive to the movement of said table from its neutral position for further varying said fuel supply motor.

21. In a control system, a fuel supply control motor, a control device comprising a galvanometer and pointer deflectable in response to variations of temperature from a predetermined value, a table cooperating with said pointer, a motor for operating said table, circuit connections to said fuel control motor and to said table operating motor, said motor circuits being connected in parallel with each other and means operated in accordance with the deflection of said galvanometer pointer for operating said table control motor and said fuel control motor.

22. In a control system, a fuel supply control motor, a control device comprising a galvanometer and pointer deflectable in response to variations of temperature from a predetermined value of a temperature to be controlled, a table cooperating with said pointer, a motor for operating said table from neutral position, circuit connections to said fuel control motor and to said table control motor, said motor circuits being connected in parallel, means responsive to the deflection of said galvanometer pointer for operating said table control motor and said fuel control motor, and means responsive to the movement of said table from neutral position for operating said fuel control motor.

23. In a control system, a device the temperature of which is to be controlled, a control motor for controlling the supply of fuel to said device, a control device comprising a galvanometer and pointer deflectable in response to variations of the temperature of said device from a predetermined value, a table periodically cooperating with said galvanometer pointer, a motor for operating said table from neutral position, circuit connections to said fuel control motor and to said table operating motor, said motor circuits being connected in parallel with respect to each other, means responsive to the deflection of said galvanometer pointer for operating said table motor and said fuel control motor, means responsive to the movement of said table from neutral position for operating said fuel control motor and means operative while said table responsive means operates for preventing operation of said table control motor.

24. In a temperature control system, a device to be maintained at a predetermined temperature, a fuel supply therefor, a motor for controlling the rate of supply of fuel to said device, a controller responsive to variations from the predetermined temperature of said device, said controller comprising a galvanometer and a pointer, said pointer being deflected from a neutral position in accordance with the temperature variations, a table having a neutral position with respect to said pointer and periodically co-operating therewith, a pair of electrical contacts controlled by said pointer co-operating with said table, a circuit extending from said electrical contacts to said fuel control motor, a table operating motor, an electrical circuit connected in multiple with said fuel control motor extending from said contacts to said table motor, means for operating said table periodically, means jointly controlled by said table and pointer and responsive to the extent of deflection of said pointer for closing one of said contacts a variable period of time in accordance with the extent of deflection of said pointer, whereby multiple circuits are completed to operate said fuel control motor and said table control motor, means controlled by said fuel control motor for varying the rate of fuel supply to said device and means solely controlled by said table control motor for moving said table with respect to said pointer in the direction of the deflection thereof.

25. In a temperature control system, a device to be maintained at a predetermined temperature, a fuel supply therefor, a motor for controlling the rate of supply of fuel to said device, a controller responsive to variations from the predetermined temperature of said device, said controller comprising a galvanometer and a pointer, said pointer being deflected from a neutral position in accordance with the temperature variations, a table having a neutral position with respect to said pointer and periodically co-operating therewith, a pair of electrical contacts controlled by said pointer co-operating with said table, a circuit extending from said electrical contacts to said fuel control motor, a table operating motor, an electrical circuit connected in multiple with said fuel control motor extending from said contacts to said table motor, means for operating said table periodically, means jointly controlled by said table and pointer and responsive to the extent of deflection of said pointer for closing one of said contacts a variable period of time in accordance with the extent of deflection of said pointer, whereby multiple circuits are completed to operate said fuel control motor and said table control motor, means controlled by said fuel control motor for varying the rate of fuel supply to said device, means controlled by said table control motor for moving said table with respect to said pointer in the direction of the deflection thereof and a second circuit for said fuel control motor.

26. In a temperature control system, a device to be maintained at a predetermined temperature, a fuel supply therefor, a motor for controlling the rate of supply of fuel to said device, a controller responsive to variations from the predetermined temperature of said device, said controller comprising a galvanometer and a pointer, said pointer being deflected from a neutral position in accordance with the temperature variations, a table having a neutral position with respect to said pointer and periodically co-operating therewith, a pair of electrical contacts controlled by said pointer co-operating with said table, a circuit extending from said electrical contacts to said fuel control motor, a table operating motor, an electrical circuit connected in multiple with said fuel control motor extending from said contacts to said table motor, means for operating said table periodically, means jointly controlled by said table and pointer and responsive to the extent of deflection of said pointer for closing one of said contacts a variable period of time in accordance with the extent of deflection of said pointer, whereby multiple circuits are completed to operate said fuel control motor and said table control motor, means controlled by said fuel control motor for varying the rate of fuel supply to said device, means controlled by said table control motor for moving said table with respect to said pointer in the direction of the deflection thereof, a second circuit for said fuel control motor in multiple with respect to said fuel control motor circuit, a plurality of contacts in said last mentioned multiple circuit and means controlled by said table when moved from normal position for selectively closing said contacts.

27. In a temperature control system, a device to be maintained at a predetermined temperature, a fuel supply therefor, a motor for controlling the rate of supply of fuel to said device, a controller responsive to variations from the predetermined temperature of said device, said controller comprising a galvanometer and a pointer, said pointer being deflected from a neutral position in accordance with the temperature variations, a table having a neutral position with respect to said pointer and periodically co-operating therewith, a pair of electrical contacts controlled by said pointer co-operating with said table, a circuit extending from said electrical contacts to said fuel control motor, a table operating motor, an electrical circuit connected in multiple with said fuel control motor extending from said contacts to said table motor, means for operating said table periodically, means jointly controlled by said table and pointer and responsive to the extent of deflection of said pointer for closing one of said contacts a variable period of time in accordance with the extent of deflection of said pointer, whereby multiple circuits are completed to operate said fuel control motor and said table control motor, means controlled by said fuel control motor for varying the rate of fuel supply to said device, means controlled by said table control motor for moving said table with respect to said pointer in the direction of the deflection thereof, a second circuit for said fuel control motor in multiple with respect to said fuel control motor circuits, a plurality of contacts in said last mentioned multiple circuit, means controlled by said table when moved from normal position for selectively closing said contacts, and a circuit completing contact in said multiple circuit.

28. In a temperature control system, a device to be maintained at a predetermined temperature, a fuel supply therefor, a motor for controlling the rate of supply of fuel to said device, a controller responsive to variations from the predetermined temperature of said device, said controller comprising a galvanometer and a pointer, said pointer being deflected from a neutral position in accordance with the temperature variations, a table having a neutral position with respect to said pointer and periodically co-operating therewith, a pair of electrical contacts controlled by said pointer co-operating with said table, a circuit extending from said electrical contacts to said fuel control motor, a table operating motor, an electrical circuit connected in multiple with said fuel control motor extending from said contacts to said table motor, means for operating said table periodically, means jointly controlled by said table and pointer and responsive to the extent of deflection of said pointer for closing one of said contacts a variable period of time in accordance with the extent of deflection of said pointer, whereby multiple circuits are completed to operate said fuel control motor and said table control motor, means controlled by said fuel control motor for varying the rate of fuel supply to said device, means controlled by said table control motor for moving said table with respect to said pointer in the direction of the deflection thereof, a second circuit for said fuel control motor in multiple with respect to said fuel control motor circuits, a plurality of contacts in said last mentioned multiple circuit, means controlled by said table when moved from normal position for selectively closing said contacts, a circuit completing contact in said multiple circuit, said contact being periodically closed at intervals substantially long with respect to the periodic operation of said control table for completing the fuel control motor circuit in accordance with the position of said table from neutral position, a pair of contacts in said table control motor circuit and said contacts being opened simultaneously with the closing of said last mentioned completing contacts.

29. In a temperature control system, a device to be maintained at a predetermined temperature, a fuel supply therefor, a motor for controlling the rate of supply of fuel to said device, a controller responsive to variations from the predetermined temperature of said device, said controller comprising a galvanometer and a pointer, said pointer being deflected from a neutral position in accordance with the temperature variations, a table having a neutral position with respect to said pointer and periodically co-operating therewith, a table operating motor, means controlled by said pointer co-operating with said table for variably operating said fuel control motor in accordance with the deflection of said pointer, means controlled by said pointer co-operating with said table for variably operating said table motor in accordance with the deflection of said pointer, a second means for operating said fuel control motor, means controlled by said table when moved from normal position for operating said second means, means for periodically conditioning said second means for control by said table controlled means, the period of said periodic means being substantially long with respect to the period of said table and means simultaneously operative with said table controlled means for rendering said table motor non-operative.

30. In a temperature control system, a device to be maintained at a predetermined temperature, a fuel supply therefor, a motor for controlling the rate of supply of fuel to said device, a controller responsive to variations from the predetermined temperature of said device, said controller comprising a galvanometer and a pointer, said pointer being deflected from a neutral position in accordance with the temperature variations, a table having a neutral position with respect to said pointer and periodically co-operating therewith, a table operating motor, means controlled by said pointer co-operating with said table for variably operating said fuel control motor in accordance with the deflection of said pointer, means controlled by said pointer co-operating with said table for variably operating said table motor in accordance with the deflection of said pointer, a second means for operating said fuel control motor, means controlled by said table when moved from normal position for operating said second means, means for periodically conditioning said second means for control by said table controlled means and means simultaneously operative with said table controlled means for rendering said table motor non-operative.

31. In a temperature control system, a device to be maintained at a predetermined temperature, a fuel supply therefor, a motor for controlling the rate of supply of fuel to said device, a controller responsive to variations from the predetermined temperature of said device, said controller comprising a galvanometer and a pointer, said pointer being deflected from a neutral position in accordance with the temperature variations, a table having a neutral position with respect to said pointer and periodically co-operating therewith, a pair of electrical contacts controlled by said pointer co-operating with said table, a circuit extending from said electrical contacts to said fuel control motor, a table control motor, an electrical circuit connected in multiple with said fuel control motor extending from said contacts to said table motor, means for operating said table periodically, means jointly controlled by said table and pointer and responsive to the extent of deflection of said pointer for closing one of said contacts a variable period of time in accordance with the extent of deflection of said pointer, whereby multiple circuits are completed to operate said fuel control motor and said table operating motor, means controlled by said fuel control motor for varying the rate of fuel supply to said device, means controlled by said table control motor for moving said table with respect to said pointer in the direction of the deflection thereof, a second circuit for said fuel control motor in multiple with respect to said fuel control motor circuit, a plurality of contacts in said last mentioned multiple circuit, means controlled by said table when moved from normal position for selectively closing said contacts, a circuit completing contact in said multiple circuit, said contact being periodically closed at intervals substantially long with respect to the periodic operation of said control table for completing the fuel control motor circuit in accordance with the deflection of said table from neutral position, a pair of contacts in said table control motor circuit, said contacts being opened simultaneously with the closing of said last mentioned completing contacts.

32. In a temperature control system, a device to be maintained at a predetermined temperature, a fuel supply therefor, a motor for controlling the rate of supply of fuel to said device, a controller responsive to variations from the predetermined temperature of said device, said controller comprising a galvanometer and a pointer, said pointer being deflected from a neutral position in accordance with the temperature variations, a table having a neutral position with respect to said pointer and periodically co-operating therewith, a pair of electrical contacts controlled by said pointer co-operating with said table, a circuit extending from said electrical contacts to said fuel control motor, a table control motor, an electrical circuit connected in multiple with said fuel control motor extending from said contacts to said table motor, means for operating said table periodically, means jointly controlled by said table and pointer and responsive to the extent of deflection of said pointer for closing one of said contacts a variable period of time in accordance with the extent of deflection of said pointer, whereby multiple circuits are completed to operate said fuel control motor and said table control motor, means controlled by said fuel control motor for varying the rate of fuel supply to said device, means controlled by said table control motor for moving said table with respect to said pointer in the direction of the deflection thereof, a second circuit for said fuel control motor in multiple with respect to said fuel control motor circuit, a plurality of contacts in said last mentioned multiple circuit, means controlled by said table when moved from normal position for selectively closing said contacts, a circuit completing contact in said multiple circuit, said contact being periodically closed at intervals substantially long with respect to the periodic operation of said control table for completing the fuel control motor circuit in accordance with the position of said table from neutral position, a pair of contacts in said table control motor circuit, said contacts being opened simultaneously with the closing of said last mentioned completing contacts and a second pair of contacts in said table control motor circuit operated when said table has moved to predetermined positions from normal for preventing further movement of said table therefrom.

33. The method of temperature control which comprises varying the fuel supply in accordance with the extent of departure of the temperature from normal and further varying the fuel supply in accordance with the rate of return of the temperature to normal.

34. In combination, control apparatus, a controlled device, said control apparatus normally having a fixed relation with respect to said controlled device, means controlled by said control apparatus under predetermined conditions for operating said controlled device while maintaining said relation fixed and means responsive to other conditions for controlling said last mentioned means to vary the relation of said controlled device with respect to said control apparatus.

In testimony whereof I affix my signature.

ROSCOE D. BEAN.

CERTIFICATE OF CORRECTION.

Patent No. 1,825,932.                      Granted October 6, 1931, to

ROSCOE D. BEAN.

It is hereby certified that error appears in the printed specification of the above numbered patent requiring correction as follows: Page 8, line 110, claim 18, for "and" read said; and that the said Letters Patent should be read with this correction therein that the same may conform to the record of the case in the Patent Office.

Signed and sealed this 17th day of November, A. D. 1931.

(Seal)
                                               M. J. Moore,
                                 Acting Commissioner of Patents.